Oct. 11, 1955     D. B. DOOLITTLE     2,720,367
METHOD OF MANEUVERING COMBINATION SUBMARINE AND AIRCRAFT
Filed Oct. 15, 1951     2 Sheets-Sheet 1
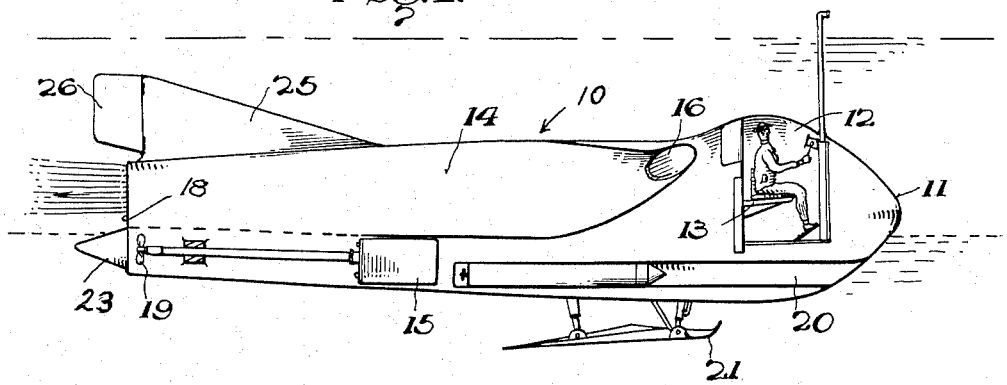
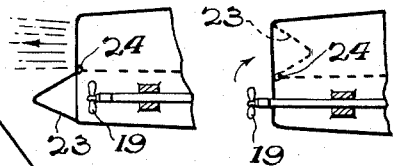
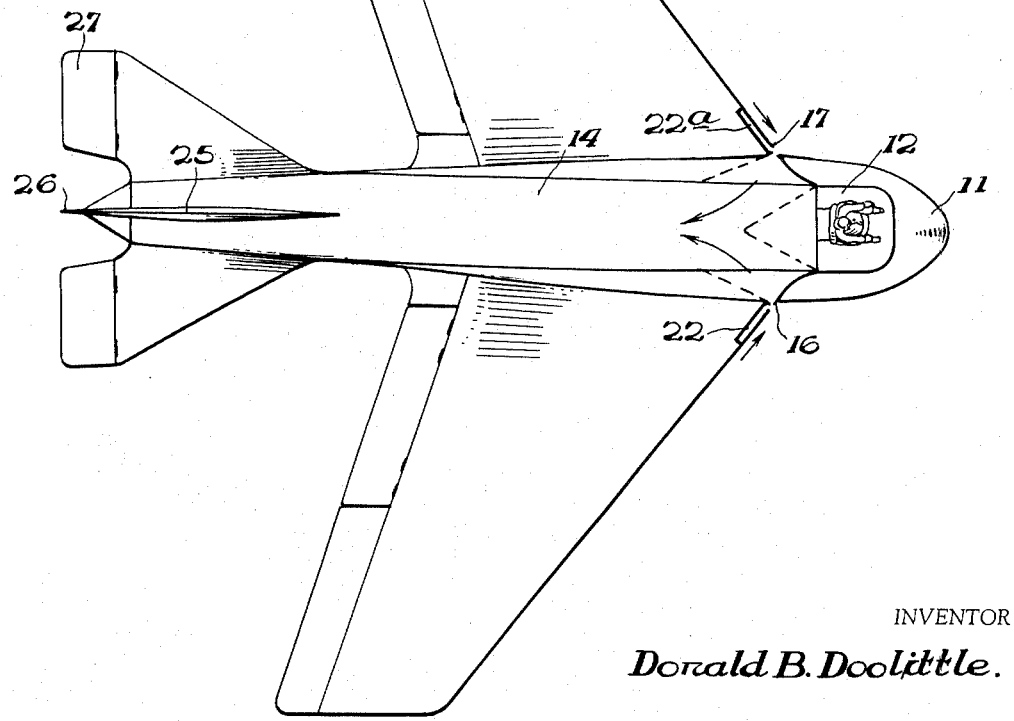
INVENTOR
Donald B. Doolittle.
BY Herbert M. Birch
ATTORNEY Oct. 11, 1955     D. B. DOOLITTLE     2,720,367
METHOD OF MANEUVERING COMBINATION SUBMARINE AND AIRCRAFT
Filed Oct. 15, 1951     2 Sheets-Sheet 2
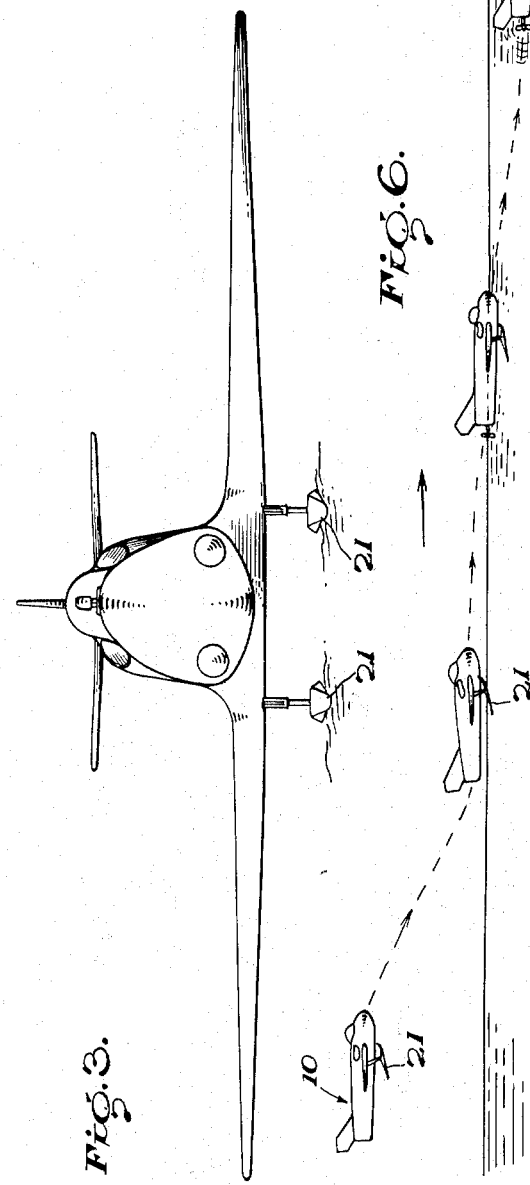
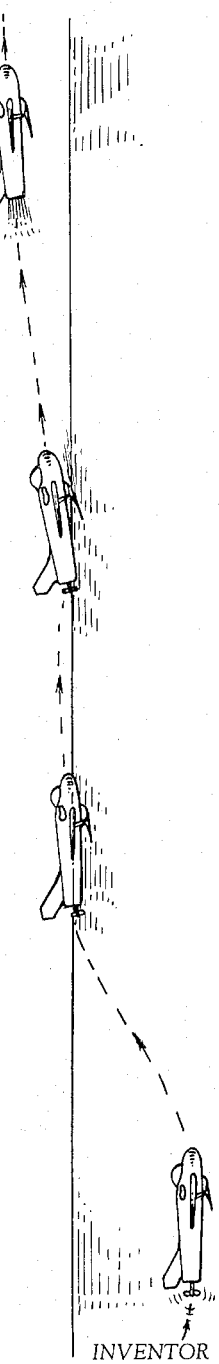
INVENTOR
Donald B. Doolittle.
BY Herbert M. Birch
ATTORNEY

United States Patent Office 2,720,367
Patented Oct. 11, 1955

2,720,367

METHOD OF MANEUVERING COMBINATION SUBMARINE AND AIRCRAFT

Donald B. Doolittle, Wilmington, Del., assignor, by mesne assignments, to All American Engineering Company, Wilmington, Del., a corporation of Delaware Application October 15, 1951, Serial No. 251,316

1 Claim. (Cl. 244—1)

The present invention relates to a combination submarine and aircraft.

It is an object of this invention to provide a craft body constructed with or without ballast tanks and the like, said body being suitable for submarine use and including a marine propeller and engine for use when the craft is used on and under water, in combination with air sustaining wings and controls with known jet propulsion means when the craft is used for aerial flight, and further in combination with variable area planing surface landing gear, such as illustrated, described and claimed in prior co-pending application, Serial Number 142,654, filed February 6, 1950 now U. S. Patent No. 2,647,709 of August 4, 1953. Such planing means have an aspect ratio less than one, that is, the square of the span divided by the plan-form area. Also, such planing means provide hydrodynamic lift for the craft body from the partially submerged hydrostatic support of water, while running under water or planing under the water.

Accordingly, another object is to provide means to transfer a craft from water surface travel and a partial submerged support due to hydrostatic force to a complete support due to hydrodynamic effects, until the craft is launched into the air.

Another object is to provide a jet type aircraft for travel through fluid mediums, such as air or water, whereby the usual aircraft controls are utilized also for underwater travel in substantially the same manner as when flying through the air, so that the craft in principle continues flight through the relatively denser fluid, such as water without need of any structural alterations.

Another object is to provide a method of craft control comprising the maneuvering of a marine craft from flight in the air as an aircraft to a water surface and thence to a submerged position below the water surface as a submarine craft while using the same controls, such as the rudder and ailerons for both air and underwater operation.

Another object is to provide a method of craft operation comprising the maneuvering of a combined jet aircraft and marine craft capable of submarine activity from a submerged position below the surface of a body of water, capable of emerging to the surface of said water, and then by utilizing water planing surface landing gear taking off from the water surface into the air.

A further object is to provide pilot control of protective means for the submarine controls, the aircraft controls and the special hydro-planing surface members when one or the other is to be put into service.

Still another object is to provide a water submergible aircraft that may be landed on water or other soft or solid surface mediums including land.

With these and other objects in view which will become apparent as the invention is fully understood, the same resides in the novelty of construction, combination and arrangement of elements hereinafter described in detail and distinctly claimed in the appended claim.

The description should be read in conjunction with the accompanying drawings, which for the sake of clarity have left off the details of the variable control flaps on the hydro-planing landing gear of the prior copending application above referred to and wherein:

Figure 1 is a side elevational view of a craft, which is only schematically illustrated and may if desired include elements, such as the ballast tanks although with jet aircraft body construction ballast tanks are not essential.

Figure 2 is a top plan view of the craft.

Figure 3 is a front view of the craft.

Figure 4 is a fragmentary side detail view of the jet exhaust tail pipe and of the marine propeller and its housing.

Figure 5 is a similar view to Figure 4, but showing the marine propeller extended for use and the closure inverted and sealing off the tail pipe exhaust.

Figure 6 is a diagrammatic representation of the craft in the four steps of landing from the air to the water surface and to a submerged position under the water surface.

Figure 7 is a continuation of the several steps of operations showing the steps of surfacing, taxiing and taking off into the air from under the water surface.

Referring in detail to the drawings there is shown a craft body 10 comprising a nose 11, a pressurized compartment or fluid tight cabin 12 with a pilot's seat 13, a jet engine 14 located at the top of the craft for take-off and flight as an aircraft, and an engine or power plant 15 at the bottom of the craft for water operation. Both the intake ports 16 and 17 and the tail pipe 18 for jet exhaust are located above the vehicle water line, as shown in Figure 1, when pressurized ballast tanks, not shown, are used and fully inflated with a gas, such as nitrogen or carbon dioxide, while the marine propeller 19, engine 15 and a torpedo tube 20 are below the water line.

Also shown below the water line in Figure 1 are planing surfaces 21. These surfaces 21 will not sustain the craft on the water surface unless there is a predetermined forward speed of the craft body 10. When such a speed is attained these planing surface members take over and elevate the bottom of body 10 above the water surface as shown in Figure 3. As the forward speed is increased the greater will be the planing surface's sustaining power, until the air controls are adjusted by the pilot for a wide open throttle and take-off from the water surface into the air, see Figure 7. Prior to take-off for air travel the jet intake gates 22 and 22$^a$ and jet exhaust gates 23 are opened to permit use of the jet engine 14. These gates 22 and 22$^a$ may be sliding hatches or gates with water sealing gaskets and the exhaust tail pipe gate 23, see Figures 4 and 5, may be pivoted on a hinge 24 and swingable to water seal either the tail pipe 18 or the housing for the marine propeller 19. Also, above the water line of the craft body 10 and on the top of the body are the usual aircraft controls, such as the stabilizer 25, rudder 26 and elevators 27 used for jet propelled aircraft. These controls are also used for underwater travel, which makes the submarine action similar to flying in the denser medium.

In Figure 6 there is an illustration of a craft of the present invention coming in for a water landing and subsequent submerging as a submarine. As the pilot comes to the water surface he adjusts the planing surfaces 21 for sustaining the craft until the hatches 16, 17 and tail gate 23 are closed to seal the jet motor and until the pilot cabin is properly pressurized for submerging. Closing off of the jet engine power slows the forward planing speed and the hull of the craft body 10 settles to the water surface as the planing surfaces no longer provide sustenation. Now the marine power plant 15 is depended upon for forward or reverse motion and by filling the ballast tanks, not shown, with water the craft may be submerged and used as a submarine. It is to be understood, however, that ballast tanks are not needed with the usual jet aircraft body. These bodies are sealed and will sink due to their own weight.

The pilot cabin may be a separate pressurized capsule, and can be pressurized as required for either high altitude flight in the air or for underwater flight or operation. This capsule also may be suitably constructed so as to be jettisoned either in flight in the air or underwater flight during emerging escape.

*Summary of operation*

In order to clearly understand the operation of this vehicle, a description of a typical flight is as follows:

Figure 6 shows a take-off operation from an airport. This operation with the variable area planing surface landing gear of the above-mentioned pending application permits landing on the water surface. The wing and tail surfaces as stated are conventional and the surface of high speed modern aircraft structure necessary to exceed the speed of sound is rugged and lends itself structurally to operation under water with or without the ballast tanks. The landing gear 21 is preferably retractable.

The craft flies to its destination and a landing is made with the planing surfaces 21. Just before landing the propeller power plant 15 is started and the ballast tanks, if ballast tanks are used, are filled with gas. As the speed is reduced to approximately 35 knots on the water, the planing surfaces 21 will stall and the craft body will settle on its hull or fuselage. The jet engine is stopped and the exhaust gates and intake port gates are closed. The craft will continue on its hull at approximately 15 knots under power by the propeller 19. The ballast tanks, not shown, are then partially filled with water, which causes the craft to begin to submerge. Further submergence is obtained by further filling of the ballast tanks and by the elevator controls 27.

Suitable pressurization of the pilot's compartment is controlled by the pilot and directional control is obtained by use of the rudder 26.

After the craft has accomplished its mission, the ballast tanks are filled with sufficient gas from a suitable source, such as compressed gas bottles to obtain proper emerging operation. After the craft has surfaced or emerged by use of suitable emergency quick surfacing gear, if necessary, the jet engine ports are opened and the jet engine started. As a speed of approximately 40 knots is obtained, the planing surfaces will break through the water, emerge and plane on the surfaces over the water surface. The emergency gear, not shown, can then be deflated, the throttle opened full and take-off executed.

When ballast tanks are not used the underwater operation resembles flying as the aerial controls serve to submerge and surface the craft. The only difference between operation in the air and underwater resides in the greater density of water with respect to the density of the air.

Although only a single embodiment of the invention has been described in detail, it is to be expressly understood that the invention is not limited thereto. Various changes may also be made in the combination and arrangement of the parts without departing from the concept of the invention, as the same will now be understood by others skilled in the art.

I claim:

A method of a normally non-buoyant craft operation in a manner similar in action to continuous flight from one medium to another comprising the maneuvering of a combined air and marine craft capable of submarine activity and continuous development of lifting forces from water to air comprising the steps of travelling under water in the manner of flight in air, crossing the boundary surface between water and air by surfacing from under water to the hydrostatic support of water, developing a hydrodynamic lifting force with ski means and increasing the hydrodynamic lifting force by travelling forward under power at speeds of 50 miles per hour or more on said ski means to raise the craft from the water surface, and taking off from the water surface directly into the air with a minimum deceleration as said hydrodynamic lifting force is increased and said hydrostatic support is reduced to null.

References Cited in the file of this patent

UNITED STATES PATENTS

| | | |
|---|---|---|
| 1,421,369 | Ardo | July 4, 1922 |
| 1,672,163 | Krammer | June 5, 1928 |
| 1,835,618 | Waller | Dec. 8, 1931 |
| 1,838,354 | Bauer | Dec. 29, 1931 |
| 2,162,066 | De Asis | June 13, 1939 |
| 2,444,332 | Briggs | June 29, 1948 |
| 2,491,541 | Woodin | Dec. 20, 1949 |
| 2,539,643 | Smythe | Jan. 30, 1951 |
| 2,557,522 | Vautier | June 19, 1951 |

FOREIGN PATENTS

| | | |
|---|---|---|
| 235,363 | Great Britain | June 18, 1925 |
| 306,115 | Italy | Feb. 25, 1933 |